United States Patent [19]
Jewell

[11] Patent Number: 5,940,564
[45] Date of Patent: Aug. 17, 1999

[54] DEVICE FOR COUPLING A LIGHT SOURCE OR RECEIVER TO AN OPTICAL WAVEGUIDE

[75] Inventor: Jack L. Jewell, Boulder, Colo.

[73] Assignee: Picolight, Inc., Boulder, Colo.

[21] Appl. No.: 08/905,938

[22] Filed: Aug. 5, 1997

[51] Int. Cl.⁶ .................................................. G02B 6/36
[52] U.S. Cl. .................................................. 385/93; 385/35
[58] Field of Search .............................. 385/147, 35, 93, 385/33

[56] References Cited

U.S. PATENT DOCUMENTS

| | | | |
|---|---|---|---|
| Re. 34,790 | 11/1994 | Musk | 385/93 |
| 4,204,743 | 5/1980 | Etaix | 385/93 |
| 4,265,511 | 5/1981 | Nicia et al. | 385/33 |
| 4,307,934 | 12/1981 | Palmer | 385/89 |
| 4,451,115 | 5/1984 | Nicia et al. | 385/74 |
| 4,501,637 | 2/1985 | Mitchell et al. | 438/27 |
| 4,687,285 | 8/1987 | Hily et al. | 385/93 |
| 4,707,067 | 11/1987 | Haberland et al. | 385/90 |
| 4,711,521 | 12/1987 | Thillays | 385/93 |
| 4,740,259 | 4/1988 | Heinen | 385/93 |
| 4,752,109 | 6/1988 | Gordon et al. | 385/14 |
| 4,753,508 | 6/1988 | Meuleman | 385/93 |
| 4,790,618 | 12/1988 | Abe | 385/93 |
| 4,818,053 | 4/1989 | Gordon et al. | 385/93 |
| 4,824,202 | 4/1989 | Auras | 385/93 |
| 4,842,391 | 6/1989 | Kim et al. | 385/93 |
| 5,073,047 | 12/1991 | Suzuki et al. | 385/93 |
| 5,074,682 | 12/1991 | Uno et al. | 385/93 |
| 5,175,783 | 12/1992 | Tatoh | 385/93 |
| 5,181,265 | 1/1993 | Nishiwaki et al. | 385/33 |
| 5,247,595 | 9/1993 | Foldi | 385/93 |
| 5,257,336 | 10/1993 | Dautartas | 385/93 |
| 5,337,398 | 8/1994 | Benzoni et al. | 385/93 |
| 5,347,605 | 9/1994 | Isalsson | 385/93 |
| 5,452,389 | 9/1995 | Tonai et al. | 385/93 |
| 5,463,707 | 10/1995 | Nakata et al. | 296/51 |
| 5,504,828 | 4/1996 | Cina et al. | 385/93 |
| 5,526,455 | 6/1996 | Akita et al. | 385/93 |
| 5,537,504 | 7/1996 | Cina et al. | 385/93 |
| 5,546,212 | 8/1996 | Kunikane et al. | 385/93 |
| 5,566,265 | 10/1996 | Spaeth et al. | 385/93 |
| 5,600,741 | 2/1997 | Hauer et al. | 385/93 |
| 5,737,133 | 4/1998 | Ouchi et al. | 385/93 |
| 5,778,124 | 7/1998 | Nedstedt | 385/93 |
| 5,835,514 | 11/1998 | Yuen et al. | 385/93 |

*Primary Examiner*—Hung N. Ngo
*Attorney, Agent, or Firm*—Jagtiani & Associates

[57] ABSTRACT

An improved connector is provided. The connector comprises: an optoelectronic transducer having a transducer axis through a center of the optoelectronic transducer, and a first alignment means integrated with the optoelectronic transducer; an optical fiber having a fiber axis being different than the transducer axis; a first lens comprising a ball lens disposed between the optoelectronic transducer and the optical fiber, a center of the first lens aligned to the optoelectronic transducer axis by the first alignment means; and a second lens between the optical fiber and the first lens, a center of the second lens aligned to the fiber axis by a second alignment means; wherein the first and second lenses form an optical relay which relays light between the center of the optoelectronic transducer and the center of the optical fiber, forming an efficient optical coupling between the optoelectronic transducer and the optical fiber, even though the transducer axis and the fiber axis do not coincide. In addition, a method for manufacturing the connector is also disclosed.

68 Claims, 4 Drawing Sheets

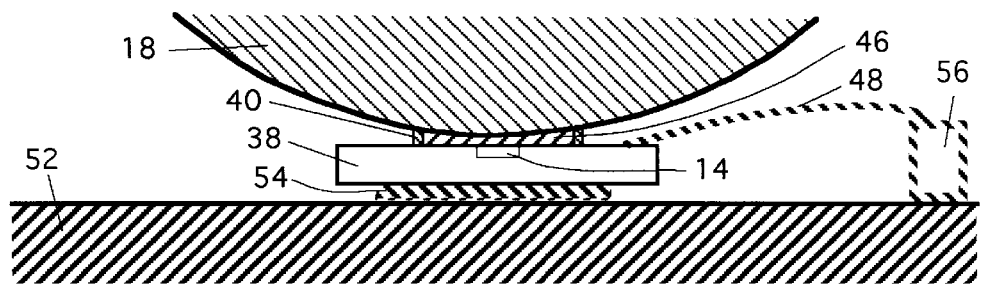
Figure 7
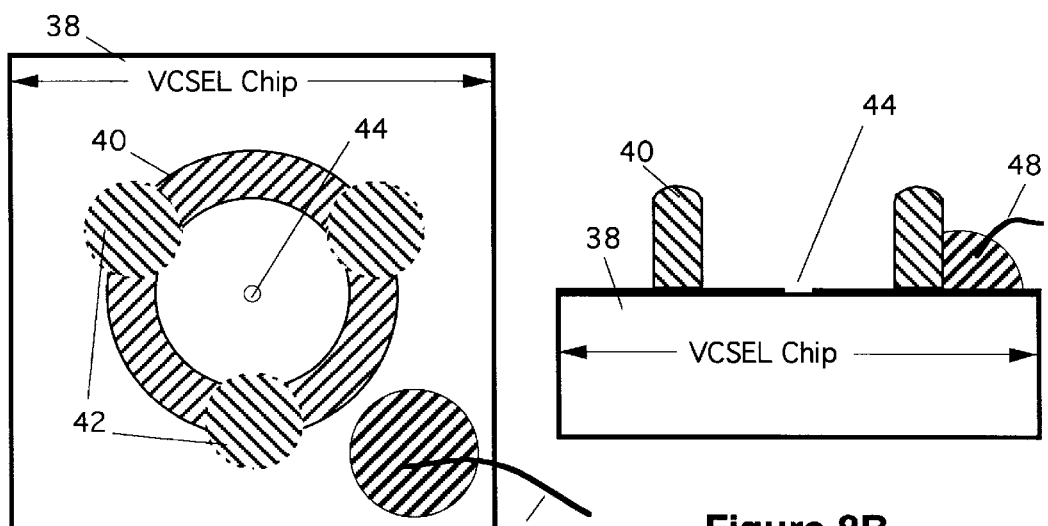
Figure 8A
Figure 8B
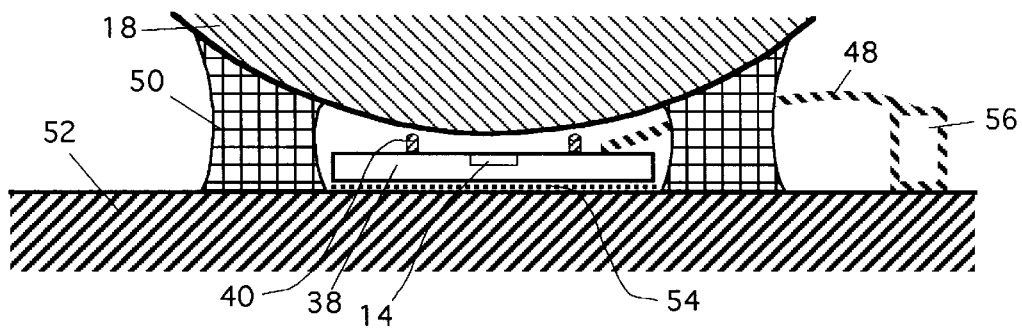
Figure 9

DEVICE FOR COUPLING A LIGHT SOURCE OR RECEIVER TO AN OPTICAL WAVEGUIDE

BACKGROUND OF THE INVENTION

1. Field of the Invention

The present invention relates generally to connectors, and more particularly to a connector for passively aligning a light source or detector to an optical waveguide such as a fiber optic cable or bundle.

2. Description of the Prior Art

Communication systems are now being developed in which optical waveguides such as optical fibers are used as conductors for modulated light waves to transmit information. These fibers may be utilized for long distance communication networks, fiber to the home networks, wide area networks, or local area networks.

The communication networks used comprise at least a connector between the optical waveguide and a detector or light emitter. These detectors convert the signal from the light waves to an electrical signal which may be used by conventional electrical devices such as a computer. The light emitters, on the other hand, perform the opposite function. They convert an electrical signal into an optical signal. A generic term of either a light emitter or a detector is an "optoelectronic transducer."

This application addresses the efficiency of optical coupling between an optical waveguide and an optoelectronic transducer. High efficiency coupling requires: 1) close matching of the sizes of the light beam and the waveguide; 2) close matching of the angular extent of the light beam with the acceptance angle of the waveguide; and 3) close positional alignment between the light beam and the waveguide. Furthermore, real world effects such as temperature changes, may change the alignment. For this reason, many commercial couplers compromise efficiency for slight positional tolerances. For example, the light beam may be focused to a spot smaller than the waveguide with the inevitable result that some light will be lost in the waveguide.

The prior art has also addressed the alignment problem by actively aligning the above elements. The major disadvantage of active alignment is the cost associated with this process. For example, for a device to be actively aligned, the light source needs to be turned on and the other elements aligned with the light source while the device is activated. By using this approach, one must carefully align each device produced. Obviously, this is not preferably if one is to mass produce these elements.

There are numerous patents which teach active alignment as discussed above. For example, U.S. Pat. No. 4,204,743, by Etaix, discloses an actively aligned connector for coupling an optical fiber to a light emitter or receiver. This reference teaches the use of a truncated cone in order to facilitate its contacting the emitter or receiver without being obstructed by electrical connections to the emitter or receiver. This device is activated to align the emitter with the optics. Additionally, this device is very intolerant to off axis alignment of the optical lenses.

U.S. Pat. No. 4,307,934, by Palmer, discloses a packaged fiber optic module which utilizes two oppositely oriented convex lenses to transmit light between a light source and a fiber bundle. Because of the use of this particular construction, the distance between the fiber bundle and its associated convex lens is critical since this lens functions to focus the light beam generated by the light source. Therefore, it is essential that active alignment be utilized in this device. Additionally, this device is very intolerant to off axis alignment of the optical lenses.

U.S. Pat. No. 4,687,285, by Hily et al, discloses a packaged fiber optic module which utilizes two oppositely oriented plano-convex lenses in combination with a ball lens to transmit light between a light source and a fiber bundle. As may be seen, the axis of each lens must be in perfect alignment for this system to function properly. Therefore, this device is very intolerant to off axis alignment of the optical lenses. This reference also teaches the use of an adhesive to allow the ball lens to be manipulated during the active alignment process.

U.S. Pat. No. 4,687,285, by Haberland et al, discloses a packaged fiber optic module which has an active alignment positioning means. In addition, this reference teaches the use of a single spherical or cylindrical lens for focusing a light beam from a fiber optic cable onto a detector. As may be seen in FIG. 8, it is critical to align this spherical lens to the cable in order to achieve coupling between the cable and the detector. Therefore, this device is very intolerant to off axis alignment of the optical lenses.

U.S. Pat. No. 4,711,521, by Thilays, discloses a terminal device for an optical fiber. A mechanical guiding operation, by means of a pin, is used to actively position a ball lens with respect to a fiber optic cable end. The ball lens utilized by this reference must be the same order of magnitude as the exit aperture, e.g., 80 to 100 microns for the ball lens and 200 microns for the aperture. This is an essential to allow precision alignment. Therefore, this device is very intolerant to off axis alignment of the optical lens with the aperture.

U.S. Pat. No. 4,753,508, by Meuleman, discloses an optical coupling device which utilizes a reflective cavity to provide optical coupling between a fiber cable and a light emitter. A spherical lens is aligned with the optical axis of the fiber cable and is disposed outside of the reflective cavity. Precision active alignment of the spherical lens to the fiber cable is essential for the operation of this device. Therefore, this device is very intolerant to off axis alignment of the optical lens.

U.S. Pat. No. 5,347,605, by Isaksson, discloses an optoelectronic connector which is actively aligned. To perform this alignment, a mirror is provided which is journaled and is adjusted to provide maximum coupling efficiency while the light source is active.

U.S. Pat. Nos. 5,537,504, and 5,504,828, both by Cina et al., disclose a transducer, a spherical lens and an optical fiber cable in axial alignment with one another. This is accomplished by activating the transducer and aligning the spherical lens with respect to the fiber cable. Once this is done, the position of the laser and lens is fixed by heating an epoxy layer. In addition, the spherical lens is provided with different surfaces, one for collimating light and one for introducing a spherical aberration that compensates for lens position. Precision active alignment of the spherical lens to the fiber cable is essential for the operation of this device. Therefore, this device is very intolerant to off axis alignment of the optical lens, even with the second surface of the spherical lens.

U.S. Pat. No. 4,842,391, by Kim et al., discloses an optical coupler which utilizes two spherical lenses between a laser diode and a fiber cable. As may be seen, active alignment is provided by a set of screws which is used to actively align the optical elements to increase coupling efficiency.

U.S. Pat. Nos. 4,265,511 and 4,451,115, both issued to Nicia et al. disclose the use of two ball lenses for coupling optical fibers. In a similar fashion, U.S. Pat. No. 5,175,783, by Tatoh, discloses a similar structure. These patents disclose the concept of carefully aligning each fiber in a tube to a precise axial and distance position with respect to its respective ball lens. Therefore, these devices are very intolerant to off axis alignment of the optical lens.

Other patents which disclose active alignment of a lens to a fiber cable include: U.S. Pat. No. 5,526,455, by Akita et al.; U.S. Pat. No. Re 34,790, by Musk; U.S. Pat. No. 5,073,047, by Suzuki et al; U.S. Pat. No. 4,824,202, by Auras; U.S. Pat. No. 4,818,053, by Gordon et al; U.S. Pat. No. 4,790,618, by Abe; U.S. Pat. No. 5,452,389, by Tonai et al.; and U.S. Pat. No. 4,752,109, by Gordon et al. Precision active alignment of the lens to the fiber cable is essential for the operation of these devices. Therefore, these devices are very intolerant to off axis alignment of the optical lens to the light source.

The prior art has addressed this issue of off axis alignment of the fiber cable and the light source. For example, U.S. Pat. No. 5,566,265, by Spaeth et al., discloses a module for bi-directional optical signal transmission. In this device, a plano-convex lens is aligned with the optical axis of a fiber cable and a beam splitter is aligned with a edge emitting light source. By adjusting the beam splitter in relation to the plano-convex lens, one may correct for off axis alignment of the light source and the fiber cable. In a similar fashion, U.S. Pat. No. 5,463,707, by Nakata et al., discloses the use of a barrel lens instead of a plano-convex lens. U.S. Pat. No. 5,546,212, by Kunikane et al., discloses the use of a prism instead of a beam splitter. U.S. Pat. No. 5,074,682, by Uno et al., discloses the use of a Grin rod lens instead of a beam splitter.

The prior art has also addressed methods for aligning a spherical lens with a light source. For example, U.S. Pat. No. 4,740,259 by Heinen, and U.S. Pat. No. 4,501,637, by Mitchell et al., both discuss aligning a spherical lens to a Light Emitting Diode (LED). Neither of these references address the problems associated with utilizing these structures in a coupling device.

SUMMARY OF THE INVENTION

It is therefore an object of the present invention to provide a connector which will provide easy optical coupling between a light source/detector and a fiber due to the mounting tolerances of these elements being compensated for by the connector.

It is a further object to provide a connector where the insertional losses are low.

It is yet another object to provide a connector which can meet very stringent specifications for use in special environments, for example, under water or in gases of composition which may damage a light source.

It is yet another object to provide a connector where the distance between the input face of the fiber bundle is sufficiently large to allow mounting a window of a sealed housing in which a light source is accommodated.

It is yet another object to provide for significantly reduced optical aberrations generated by the connector.

In all of the above embodiments, it is an object to provide a connector which has a small number of components and high endurance against a connecting/disconnecting operation and which can be aligned easily.

According to one broad aspect of the present invention, there is provided a connector comprising: an optoelectronic transducer having a transducer axis through a center of the optoelectronic transducer, and a first alignment means integrated with the optoelectronic transducer; an optical fiber having a fiber axis being different than the transducer axis; a first lens comprising a ball lens disposed between the optoelectronic transducer and the optical fiber, a center of the first lens aligned to the optoelectronic transducer axis by the first alignment means; and a second lens between the optical fiber and the first lens, a center of the second lens aligned to the fiber axis by a second alignment means; wherein the first and second lenses form an optical relay which relays light between the center of the optoelectronic transducer and the center of the optical fiber, forming an efficient optical coupling between the optoelectronic transducer and the optical fiber, even though the transducer axis and the fiber axis do not coincide.

According to another broad aspect of the invention, there is provided a connector comprising: an optoelectronic transducer having a transducer axis and a first alignment means integrated with the optoelectronic transducer; an optical waveguide having a waveguide axis through a center of the optical waveguide and being different than the transducer axis, a ball lens proximate to the optoelectronic transducer, a center of the ball lens aligned to the optoelectronic transducer axis by the first alignment means; and a second lens disposed between the optical waveguide and the ball lens, a center of the second lens aligned to the waveguide axis by a second alignment means.

According to another broad aspect of the invention, there is provided a connector comprising: an optoelectronic transducer having a transducer axis through a center of the optoelectronic transducer, and a first alignment means integrated with the optoelectronic transducer; an optical waveguide having a waveguide axis being different than the transducer axis; a first lens comprising a ball lens disposed between the optoelectronic transducer and the optical waveguide, a center of the first lens aligned to the optoelectronic transducer axis by the first alignment means; a second lens between the optical waveguide and the first lens, a center of the second lens aligned to the waveguide axis by a second alignment means; a stage, the optoelectronic transducer is positioned at a predetermined position on the stage, the stage further comprising at least one alignment feature thereon; a first housing for attaching to the stage and being aligned with the optoelectronic transducer, the housing enclosing the first lens and the optoelectronic transducer; and a second housing for attaching to the waveguide and enclosing the second lens; wherein the first and second lenses form an optical relay which relays light between the center of the optoelectronic transducer and the center of the optical fiber, forming an efficient optical coupling between the optoelectronic transducer and the optical fiber, even though the transducer axis and the fiber axis do not coincide.

According to another broad aspect of the invention, there is provided a connector comprising: an optoelectronic transducer having a transducer axis through a center of the optoelectronic transducer, and a first alignment means integrated with the optoelectronic transducer; an optical waveguide having a waveguide axis being different than the transducer axis; a first lens comprising a ball lens disposed between the optoelectronic transducer and the optical waveguide, a center of the first lens aligned to the optoelectronic transducer axis by the first alignment means; a second lens between the optical waveguide and the first lens, a center of the second lens aligned to the waveguide axis by a second alignment means; a stage, the optoelectronic transducer is positioned at a predetermined position on the stage, the stage further comprising at least one alignment feature thereon; a housing for attaching to the stage and to the waveguide, the housing being aligned with the optoelectronic transducer, the housing enclosing the first and second lenses and the optoelectronic transducer; and wherein the first and second lenses form an optical relay which relays light between the center of the optoelectronic transducer and the center of the optical fiber, forming an efficient optical coupling between the optoelectronic transducer and the optical fiber, even though the transducer axis and the fiber axis do not coincide.

According to another broad aspect of the invention, there is provided a light emitter comprising: a vertical cavity surface emitting laser (VCSEL) residing on a semiconductor chip, the VCSEL also comprising a first alignment means integrated to the VCSEL; and a lens aligned to the VCSEL by the first alignment means, in which the lens has a lateral dimension which exceeds a lateral dimension of the semiconductor chip.

According to another broad aspect of the invention, there is provided a A light emitter comprising: a vertical cavity surface emitting laser (VCSEL) residing on a semiconductor chip, the VCSEL also comprising a first alignment means integrated to the VCSEL; a ball lens aligned to the VCSEL by the first alignment means; a stage, the optoelectronic transducer being positioned on the stage; and a first housing for attaching to the, the housing enclosing the first lens and the optoelectronic transducer.

According to another broad aspect of the invention, there is provided a A method for fabricating a connector comprising the steps of: fabricating a vertical cavity surface emitting laser (VCSEL), the VCSEL having a first optical axis through a center of the VCSEL; fabricating at least one alignment feature on the VCSEL; dicing a chip containing the VCSEL; mounting the chip to a header; mounting a ball lens to the alignment feature and thereby passively aligning the ball lens to the VCSEL; connecting a waveguide to the header so that the waveguide has a second optical axis being different so that the first optical axis.

Other objects and features of the present invention will be apparent from the following detailed description of the preferred embodiment.

BRIEF DESCRIPTION OF THE DRAWINGS

The invention will be described in conjunction with the accompanying drawings, in which:

FIG. 7 is an enlarged side elevational view of the connection between the optoelectronic source and a first ball lens as illustrated in FIGS. 1, 3, 4, and 5 which is constructed in accordance with a preferred embodiment of the invention;

FIG. 8a is a plan view of an optional mounting structure for the ball lens as illustrated in FIGS. 1, 3, 4, and 5;

FIG. 8b is an enlarged side elevational view of the mounting structure illustrated in FIG. 8a;

FIG. 9 is a side elevational view of yet another alternate embodiment for a mounting structure for the ball lens to a light source as illustrated in FIGS. 1, 3, 4, and 5;

FIG. 13b is a plan view of the mounting structure illustrated in FIG. 13a.

DETAILED DESCRIPTION OF THE PREFERRED EMBODIMENT

Figure 1:
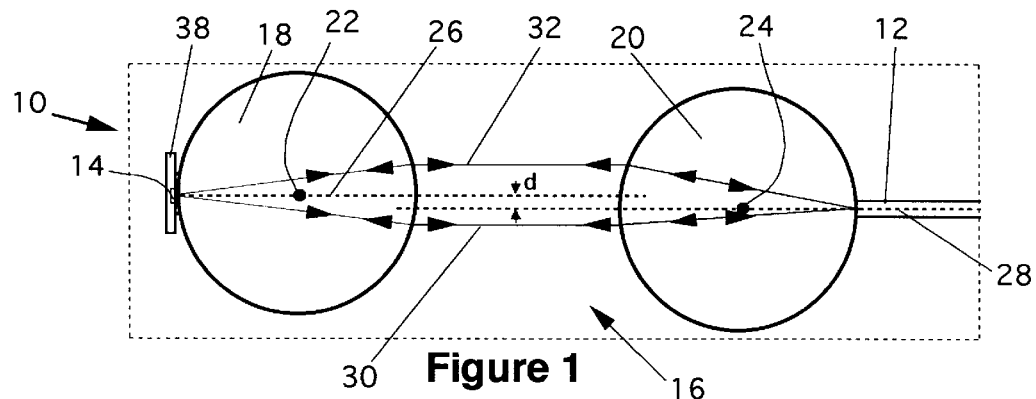
FIG. 1 is an optical connector constructed in accordance with a preferred embodiment of the invention.

With reference to the Figures, wherein like referenced characters indicate like elements throughout the several views and, in particular, with reference to FIG. 1, a connector 10 is illustrated. As may be seen, the basic system comprises an optical waveguide 12, an optoelectronic transducer 14 and an optical coupling system 16. This application will focus its discussion on the novel optical coupling system 16 and the modifications to optoelectronic transducer 14 which allow for better integration with coupling system 16. Before a discussion of the coupling system 16 may be understood, it is necessary to understand the optical properties of waveguide 12 and transducer 14. Therefore, these elements shall be discussed first.

Optical fibers or other waveguides 12 are characterized by 2 main parameters. The core diameter specifies the diameter within which light is generally guided. For rectangular or elliptical waveguides 12 this requires 2 numbers. The numerical aperture (NA) is defined as the sine of the half-angle of the acceptance angle, the acceptance angle being the angle which light exiting the waveguide 12 would diverge. For single-mode fiber 12, typical values are a core diameter of 9 $\mu$m and a NA of 0.11, for light having a wavelength in the 1.3–1.55 $\mu$m range. Multi-mode fiber 12' for high-speed data communications typically has a 62.5 $\mu$m core and an NA~0.25 for light at ~0.85 $\mu$m. It should be appreciated that this application concerns the use of a single mode fiber for optical waveguide 12. It should be appreciated that since the alignment tolerances of a multi-mode fiber 12' are significantly larger that that for a single-mode fiber 12', any optical system which will function for a single mode fiber 12 will also function for a multi-mode fiber 12'. Additionally, it should be appreciated that the converse to this statement is not true, i.e., that an optical system designed for a multi-mode fiber 12' will work for a single-mode fiber 12.

Figure 4:
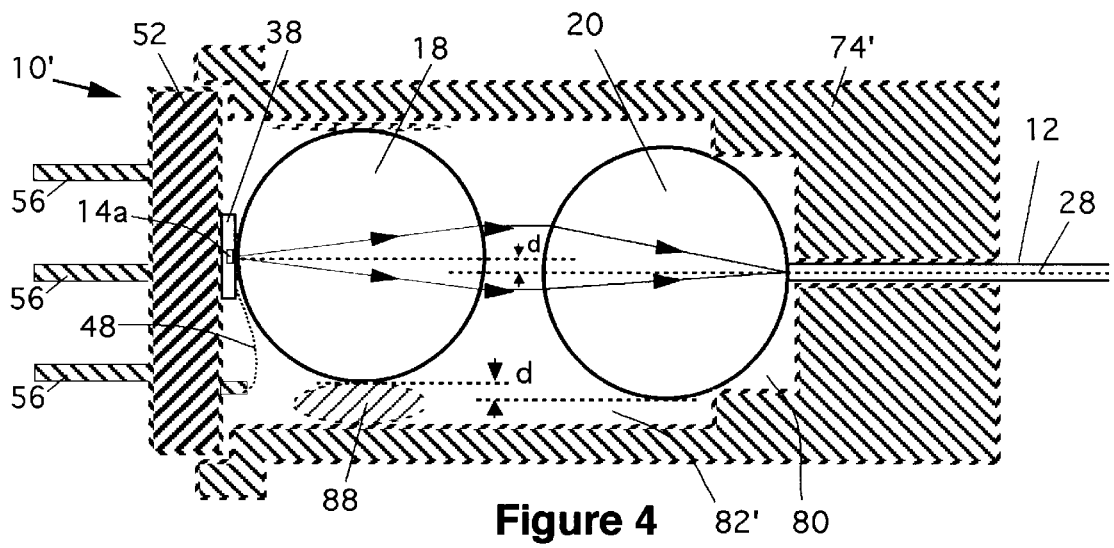
FIG. 4 is a cross-sectional view of an another alternate embodiment of the optical connector illustrated in FIG. 1, which shows an optoelectronic source aligned with an optical waveguide.
Figure 6:
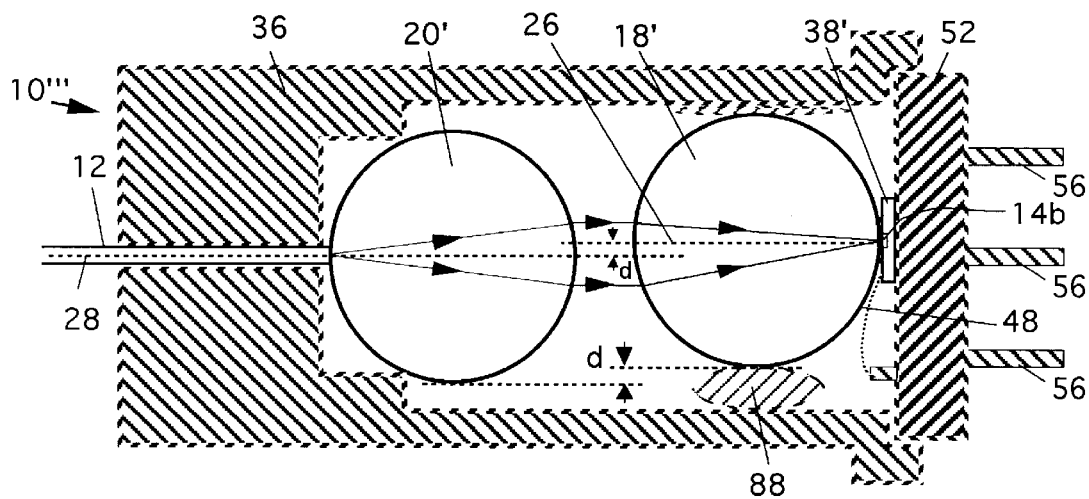
FIG. 6 is a cross-sectional view of yet another embodiment of the optical connector illustrated in FIG. 1, which shows an optoelectronic detector aligned with an optical waveguide.

Optical light emitters or light detectors, i.e., optoelectronic transducer 14, include similar specifications. An emitter may be specified by a mode diameter, or diameter over which the light emits, and the NA which is the sine of the half-angle of the beam divergence. FIG. 4 illustrates a light emitter 14a. For detectors the diameter is simply the diameter over which the incoming light is detectable. Since most detectors accept light over a very large angular range, the NA specification is not often used. FIG. 6 illustrates a light detector 14b.

The selection of the particular light emitter 14a is not arbitrary. There are numerous light emitters which may be selected from. For example, potential light emitters include surface emitting lasers and edge emitting lasers. It has been found that surface emitting lasers are preferable to edge emitting lasers because: 1) they emit low-divergence, circularly-symmetric, aberration-free beams; 2) the beams emit normal to the wafer surface, allowing straightforward fabrication in one- and two-dimensional arrays; 3) current thresholds and operating power requirements are very low; 4) they are completely fabricated on wafers, allowing automated wafer-scale testing; 5) they can be designed to operate with nearly constant characteristics over wide temperature ranges; 6) the change in wavelength with temperature is continuous and about 5 times less than that of Fabry-Perot edge-emitting lasers; and 7) device-to-device uniformity is excellent within arrays, within wafers, and from wafer to wafer. Therefore, this application considers the following light emitters 12 to be useable with the invention: Vertical-Cavity Surface-Emitting Lasers (VCSELs), or Surface-Emitting Light Emitting Diodes (SLEDs).

The amenability of VCSELs and SLEDs to low-cost high-volume production, low-cost packaging, and wavelength control make them very attractive as light emitters 12 for intermediate-distance fiber telecommunications, including fiber-in-the-loop (FITL), fiber-to-the-desk (FTTD) and fiber-to-the-home (FTTH). With regard to the above structures, the inventor has found that the preferable structure is a VCSEL.

The target for light emitter 14a is a 1.3 $\mu$m VCSEL-based transmit module for fiber communications, mostly over 0.1–20 km distances. The required ~1 mW power requirements are easily attainable with VCSELs. VCSEL geometry eliminates the need for the vertically-mounted stud used in edge-emitter mounts. Well-designed VCSELs exhibit temperature insensitive operation, reducing or eliminating the need for an external monitor, its die attach and electrical connection decreasing the number of components to be packaged. The lower divergence of the VCSEL beam allows use of a lower-power (lower-NA) lens and furthermore relaxes alignment requirements. Due to the lower beam divergence, the area in which a VCSEL may be placed with acceptable fiber coupling efficiency is 4–9 times larger than that of an edge-emitter. Alignment is therefore far easier. Packaging is the largest cost component for optoelectronics, typically making up 50–90% of the total cost. Thus, the simplified packaging forms most of the basis for lower costs.

The VCSEL-based module requires much lower operating current than an equivalent edge-emitter-based module, thus heatsinking requirements are decreased and reliability is enhanced. Modulation speeds are roughly comparable for the two types of lasers, both being easily capable of 2.4 GHz (OC-48) modulation, and even 10 GHz (OC-192) with improved design. VCSELs have cavity structures similar to phase-shifted distributed feedback (DFB) edge-emitters. DFB lasers are very expensive and are not even considered for low-cost datacom or local-loop telecom. Due to their cavity structure, VCSELs will have lower noise than the Fabry-Perot edge-emitting "loop lasers." The only area in which VCSELs are not expected to outperform edge-emitters is output power. This is because VCSELs are smaller than edge-emitters, typically by a factor of 10 in area. For this reason, VCSELs are not favored for high-power applications such as CATV, undersea cable or amplifier pumps. For the $\leq$20 km transmission lengths targeted, the 1–2 mW VCSEL output is more than sufficient and optical power is not an issue. Therefore, VCSELS are the preferred light emitter 14a for all of the embodiments discussed below.

Examples of preferred light emitters 14a may be found in the following U.S. Patents and applications: 1) U.S. application Ser. No. 08/574,165, entitled "Conductive Element with Lateral Oxidation Barrier," filed Dec. 18, 1995; 2) U.S. application Ser. No. 08/659,942, entitled "Light Emitting Device Having an Electrical Contact Through a Layer Containing Oxidized Material," filed Jun. 7, 1996; 3) U.S. application Ser. No. 08/686,489 entitled "Lens Comprising at Least One Oxidized Layer and Method for Forming Same," filed Jul. 25, 1996; 4) U.S. application Ser. No. 08/699,697 entitled "Aperture Comprising an Oxidized Region and a Semiconductor Material," filed Aug. 19, 1996; 5) U.S. application Ser. No. 08/721,769 entitled "Extended Wavelength Strained Layer Lasers Having Short Period Superlattices," filed Sep. 25, 1996; 6) U.S. application Ser. No. 08/721,589 entitled "Extended Wavelength Strained Layer Lasers Having Strain Compensated Layers," filed Sep. 25, 1996; 7) U.S. application Ser. No. 08/721,590 entitled "Extended Wavelength Strained Layer Lasers Having Nitrogen Disposed Therein," filed Sep. 25, 1996; 8) U.S. application Ser. No. 08/739,020 entitled "Extended Wavelength Strained Layer Lasers Having a Restricted Growth Surface and Graded Lattice Mismatch," filed Oct. 28, 1996; and 9) U.S. application Ser. No. 08/796,111 entitled "Intra-Cavity Lens Structures for Semiconductor Lasers," filed Feb. 7, 1997. It should be appreciated that all of these applications are invented by the applicant for the present invention. These applications are hereby incorporated by reference. As discussed above, light emitter 14a is preferably modified and these modifications will be discussed in greater detail below.

The next issue raised is the efficiency of optical coupling between the two major components discussed above. Efficient coupling of light from a light emitter 14a into a fiber 12, for example, requires (1) matching of the diameters, (2) matching of the NA's, and (3) alignment of the light beam onto the fiber core to a precision which is about half the diameter of the fiber core, and to an angular accuracy about half the angle corresponding to the NA. For single-mode fiber coupling at 1.3 $\mu$m to 1.55 $\mu$m wavelengths, this requires an accuracy of about 4.5 $\mu$m in position and less than 3° in angle. The issue of coupling efficiency shall be discussed in conjunction with the inventive concepts below.

Now that the optical properties of waveguide 12 and transducer 14 have been discussed, it is time to turn to the description of the interaction of these elements with the coupling system 16.

As may be seen in FIG. 1, an optical connector 10 constructed in accordance with a preferred embodiment of the invention is illustrated. This connector has a first lens 18 associated with the transducer 14 and a second lens 20 associated with waveguide 12. As may be seen, a center 22 of first lens 18 is aligned with an optical axis 26 of transducer 14. In a similar fashion, a center 24 of second lens 20 is aligned with an optical axis 28 of waveguide 12. The center 22 of first lens 18 is positioned a distance D from a center 24 of second lens 20, where D=F1+F1, where F1 is the focal length of first lens 18 and F2 is the focal length of the second lens 20. The boundary for an incident beam is illustrated by rays 30 and 32. One critical difference between the invention and the prior art is that optical axes 26 and 28 are misaligned by a distance d. As may be seen, the inventor has found that a ball lens should be used for lens 18. Lens 20 may be a ball lens or other lens such as a selfoc® lens. By utilizing the above structure, one is able to create an opto-mechanically stable package which is insensitive to significant lateral displacements d.

Figure 2:
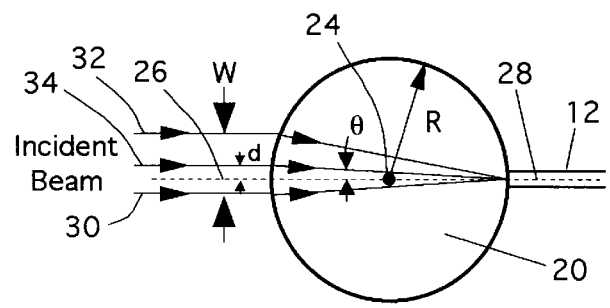
FIG. 2 is a detailed view of the lens coupling to the optical fiber of FIG. 1.

FIG. 2 shows second ball lens 20 focusing an incident beam, having a center 34 which is initially displaced by a distance d, and is focused onto optical axis 28 of optical waveguide 12 at an angle θ relative to optical axis 28 of waveguide 12. The refractive index, n, of the medium incident on the waveguide 12 multiplied by the sine of the half angle of the focused beam is known as the numerical aperture, NA, of the beam. The NA of a beam focused into a single-mode fiber is on the order of 0.11. For small NA, the full width of the incident beam is therefore:

$$W \approx 4R(NA)/n \quad (1)$$

where R is the radius of ball lens 20. Now, the angle θ is given by $$\theta \approx d/2R \quad (2)$$

where the lateral displacement d is shown in FIGS. 1, 2, 3, 4 and 6. If an angular alignment criterion having a maximum θ of ½ the NA, i.e., ~3° is set, then the expression W=4d/n results. If the displacement tolerance d is to be ±25 μm, then W≈50 μm for the full width of the incident beam. Putting this value back into equation (1) and using NA~0.11 and n=2 yields R=227.3 μm for ball lens 20. Thus a ball lens 20 having a diameter of about 0.455 mm is needed to satisfy the conditions stated. A more general expression for the ball lens is $$R \approx d/2k(NA)*(n_l/n_w) \quad (3)$$

where k is the angular tolerance criterion, chosen above to be ½, $n_l$ us the refractive index of lens 20 and $n_w$ is the refractive index of the waveguide. An even more general expression for second lens 20 is:

$$f \approx d/k(NA)n_w \quad (4)$$

where f is the focal length of lens 20 in air. Now, ball lens 18 which is mounted to the optoelectronic transducer 14 in FIG. 1 doesn't necessarily have the same size as lens 20. The ratio of sizes is determined by the ratio of the NA's of the beam focused/exiting into/from waveguide 12 and the beam exiting light emitter 14a or entering light detector 14b. For convenience, the following discussion will only talk about a transmitter 14a. It should be apparent that a detector 14b would function in a similar fashion, with the detector diameter replacing the waveguide diameter and probably relaxed angular sensitivity.

A single-mode VCSEL 14a beam typically has a NA of about 0.11, so ball lens 18 on the VCSEL 14a side should also be about 0.455 mm in diameter. Choosing a smaller angular tolerance criterion results in a larger radius R of the ball lens. The value used, k=0.5 is very large, thus a larger ball lens 18 is preferred.

The conclusion of the above analysis is that a ball lens 18, 20 of a diameter of at least ~0.5–1 mm is required to produce the desired ±25 μm lateral displacement tolerance in the system shown in FIG. 1. This size requirement rules out the possibility of using microlenses integrated to the VCSELs on a wafer scale, such as the schemes described by Jewell et al in U.S. Pat. No. 5,500,540 "Wafer Scale Optoelectronic Package". Discrete lenses are preferable.

It should be appreciated that equivalent expressions to those given above may describe the sizes of other types of lenses, e.g. selfoc® lenses. However, the requirement for the diameter, W, of the beam incident in the second lens is the same in either case. The second lens 20 may in fact be any suitable type of lens 20. As seen below, however, a ball lens 18 is strongly preferred for the light emitter 14a collimating lens.

It should be appreciated that there is criticality in the selection of the proper size of ball lens 18. First of all, if the numerical aperture of the ball lens 18 is very large, this will give rise to geometrical aberrations, a highly undesirable result. Further, if the diameter of the ball lens 18 is very small, i.e., to reduce insertion loss, it makes it very difficult to align elements of connector 10. It has been determined that the preferred size for the ball lens 18 is to be substantially larger, e.g. larger than VCSEL chip 38. The prior art of record teaches away from this finding as may be seen by U.S. Pat. Nos. 4,740,259 and 4,501,637. It should be appreciated that given the knowledge of the present invention, this selection of the proper size ball lens may then be specified for the person skilled in the art on a case-by-case basis.

Figure 3:
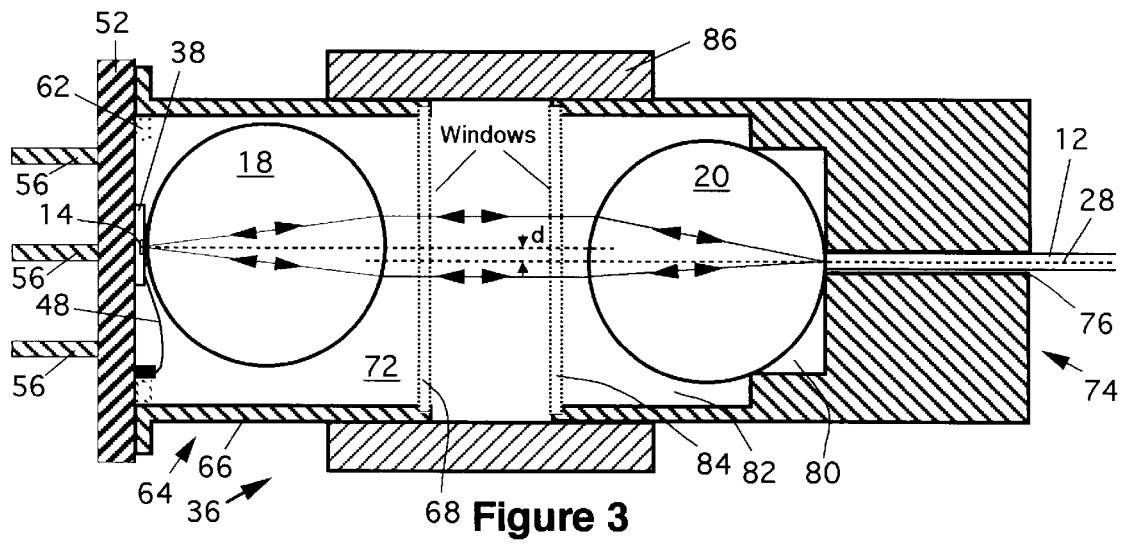
FIG. 3 is a cross-sectional view of an alternate embodiment of the optical connector illustrated in FIG. 1.
Figure 5:
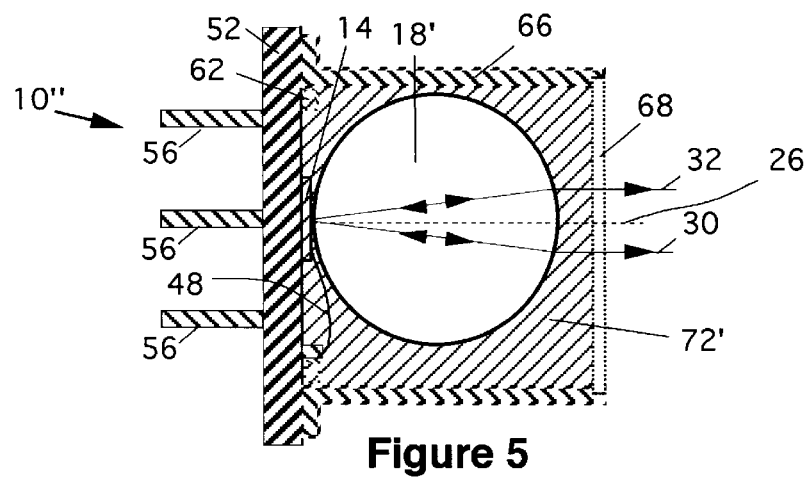
FIG. 5 is a cross-sectional view of yet another embodiment of the optical connector illustrated in FIG. 1.

Ball lenses 18, 20 are preferably made of a material having a refractive index of about twice that of the surrounding region, e.g., region 72 in FIG. 3 or region 72' in FIG. 5.

Because the optical efficiency of interface 10 is high due to the provision of lenses 18 and 20, it is possible to utilize smaller light sources than were possible with previously know arrangements. This in turn results in a lower power requirement and, of course, higher speed or response. Therefore, the combination of a ball lens optical coupling system 16 with a VCSEL 14a is mutually compatible and highly desirable.

Design of a stable coupling system must therefore be based on a stable optical coupling system 16, discussed above. FIG. 1 illustrates such a stable optical coupling system 16. A beam incident into second lens 20 will always be focused onto the center of waveguide 12, so long as a center 34 of the incident beam is strictly parallel to optical axis 28. It should be appreciated that in this case, optical axis 28 is coincident with the center of waveguide 12. Since this is coincident with the "barrel axis" of a housing 36, see FIG. 3, the term "barrel axis" will often be used to describe this relationship. This holds true for lateral displacements, d, which may be fairly large, but small compared to ball lens 18, 20 radius. A reasonable goal for passive alignment is to allow for displacements up to about 25 μm in either direction, i.e., a 50 μm or 2 mil diameter region in which the light emitter 14a chip may be placed. It should be appreciated that lens 20 may be any type of lens, for example a gradient-index selfoc® lens.

The ideal stability of focused beam position to be centered on the waveguide core 12 is based on 3 assumptions: 1) The second lens 20 must be aligned with the waveguide 12 core. 2) The beam is collimated and parallel to optical axis 28 of waveguide 12. 3) In the case of a ball lenses 18, 20, the refractive index of the ball lens 18, 20 should be 2.0 if the waveguide 12 (or transducer 14) is butted up against the side of the respective ball lens 18, 20. The first assumption is taken care of by well-designed and assembled fiber pigtails. The third one can be easily accommodated by longitudinal displacement of the fiber or modification of the lens 18, 20. Ball lenses typically have a refractive index about 1.8 to 1.9, thus the beam is focused behind (outside) the ball. Thus a known displacement of the fiber behind the ball results in the focus occurring on the fiber end. Such modifications may also accommodate a beam which is not quite collimated when it is incident on second lens 20, for example, placing second lens 20 an appropriate distance from optical waveguide 12.

The only remaining assumption listed above, the second one, is the main challenge in the stable optical system, producing a beam which is parallel to the barrel axis (optical axis), even though it may be laterally displaced. The key to achieving this condition, and therefore the key to achieving the stable optical system, is to align first lens 18 precisely with the VCSEL 14a output beam. Precise lateral alignment of this lens 18 with the VCSEL 14a beam ensures that the beam exiting lens 18 will propagate parallel to the barrel axis, even if it is laterally displaced from the axis and even if it is not exactly collimated.

For clarity, the following discussion will focus on the use of a VCSEL as light emitter 14a. While the use of a VCSEL is the preferred embodiment, it should be appreciated that the other laser structures discussed above may be used in conjunction with the teachings provided below.

FIG. 7 illustrates the bottom of ball lens 18 which is mounted to a VCSEL chip 38. As may be seen, chip 38 contains a VCSEL 14a. Ideally, the VCSEL chip 38 is on the order of 250 to 450 $\mu$m square and thus VCSEL 14 is much smaller than chip 38. Chip 38 is mounted to header or stage 52 by any suitable bonding adhesive 54 known in the bonding art, e.g., solder or conductive epoxy. Electrical connection to VCSEL 14 is provided by a wire bond 48 which in turn is connected to a pin 56. Ball lens 18 is typically larger than chip 38. The problem discussed here is that of aligning any lens 18 precisely with the center of VCSEL 14, e.g. to about 1 $\mu$m precision, without using active alignment. A ball lens 18 has a distinct and overriding advantage over other lenses for this application, its orientational isotropy. Ball lens 18 need only be mounted well-centered over VCSEL 14a, and angular orientation is not of any consequence. The tremendous simplification afforded by this property makes ball lens 18 strongly preferred for this application.

FIGS. 8a and 8b illustrate the means for passively aligning ball lens 18 to the VCSEL chip 38. An alignment ring 40 having a diameter smaller than chip 38 is patterned onto chip 38 using a wafer-scale process before the wafer is diced. The ring may be a continuous ring as shown by the solid ring in FIG. 8a, or it may comprise discrete posts 42. The dashed areas in FIG. 8a represent the tops of 3 posts centered about a VCSEL 14a aperture 44. When ball lens 18 is placed within alignment ring 40 and let go, it will simply fall into place. The lens may then be fastened in place by a variety of fastening means 46. For example, the alignment ring 40 (or posts 42) may be topped with a flowable solder. Alternatively, an epoxy may be applied with lens 18 held in place.

In order to obtain the best results the refractive index $N_c$ of the fastening means 46 should as closely as possible approximate the value of the refractive index of ball lens 18 ($N_b$).

Since ball lens 18 may be much larger than the desired size of the VCSEL chip 38, the alignment ring 40 is preferably higher than the expected height of a wire bond 48. This is shown in the side view of FIG. 8b. This height of wire bond 48 may be 50–100 $\mu$m for typical wire bonds. Such heights of features are routinely deposited in preparing wafers for flip-chip solder bump bonding. Electroplating is the preferred method for depositing such thick materials if they comprise metals. For structural stability and avoidance of contaminants, the alignment ring 40 would preferably comprise gold, however it could comprise other materials. The tops of the rings 40 (or posts 42) could comprise a flowable solder to bond lens 18 to the VCSEL chip 38. Rings 40 (or posts 42) may also comprise dielectric materials such as polyimide, e.g., Riston® which is sold by E.I. DuPont de Nemours & Co.

The diameter of the alignment ring should be as large as possible to form the most stable platform for ball lens 18. It must, however, leave room for the wire bond and not force the size of VCSEL chip 38 to be overly large. The preferred chip size is about 250 $\mu$m on a side, however, somewhat larger sizes could be advantageous since they would allow larger alignment rings 40.

The passive alignment of ball lens 18 to VCSEL 14a or detector 14b has been discussed above. Another concern that is raised is how to hold lens 18 in place very securely without exerting mechanical stress on VCSEL 14a which could affect its reliability. FIG. 9 illustrates a solution to this issue and is similar to FIG. 7. For clarity, like elements have been provided with like reference numeral except that a prime has been added to each reference numeral where there is a slight difference in the particular element in this embodiment. The following discussion will focus on the differences between the elements of this embodiment and that disclosed in FIG. 7.

Figure 12:
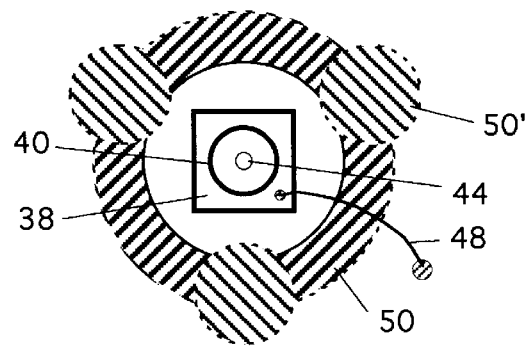
FIG. 12 is a plan view of the mounting structure illustrated in FIG. 9.

As may be seen in FIGS. 9 and 12, by surrounding VCSEL chip 38 with a ring or multiple spots of glue or adhesive 50, mechanical stress on VCSEL chip 38 may be reduced. The glue 50 should be applied before mounting ball lens 18. Glue 50 should have good adherence to ball lens 18 and the header or stage 52, and glue 50 would preferably expand (e.g. ~1%) upon setting. With glue 50 still wet, ball lens 18 is mounted on alignment posts 42 (or ring 40) as discussed above, but now making contact also with glue 50. When glue 50 sets, it expands and therefore lifts ball lens 18 off from alignment posts 42, thereby removing mechanical contact between ball lens 18 and VCSEL chip 38, but also preserving its alignment. The lifting is preferably 1000 Å or more. Glue 50 is preferably strong enough to hold ball lens 18 to stage 52 securely under all conditions of use anticipated for connector 10. An alternative to having glue 50 expand, alignment posts 42 or ring 40 could be formed such that they shrink upon subjection to the setting process or some other process, e.g. heating. The "glue" 50 may also be a solder and the alignment posts 42 or ring 40 may be, for example, metal having a thermal expansion coefficient larger than that of the solder. It should be appreciated that the term "glue" is generic for any binding substance which has the capability to either expand or contract upon setting and also has an adhesive quality for affixing ball lens 18 with respect to stage 52.

Figure 13A:
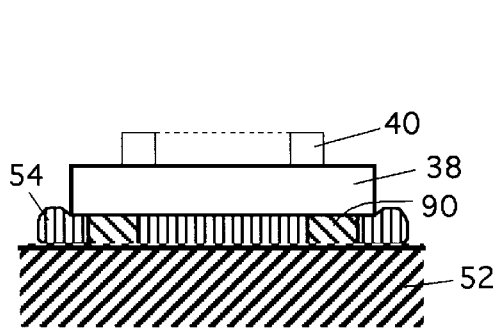
FIG. 13a is a side elevational view of a transducer which is mounted to a stage.

In order to facilitate the parallel relationship between optical axis 26 of transducer 14 and optical axis 28 of waveguide 12, it may be desirable to use angular alignment means 90 on the bottom side of chip 38, as illustrated in FIG. 13a. Chip 38 is attached to header or stage 52 by bonding adhesive 54. During the bonding process, bonding adhesive 54 is pliable and may comprise, for example, solder or conductive epoxy. Angular alignment means 90 is preferably rigid during the bonding process and may comprise, for example, gold, tungsten, or a variety of other suitable angular alignment means 92. Angular alignment means may comprise three or more individual features as illustrated by features 90, or it may comprise a more complex structure as illustrated by alternative feature 92. Angular alignment means may also comprise a closed structure such as a circle (not shown). Those skilled in the art will recognize that a wide variety of shapes for angular alignment means 90, 92 may be used advantageously.

Figure 10:
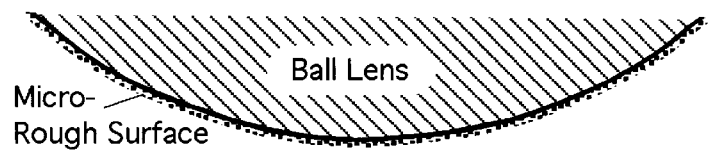
FIG. 10 is an alternate embodiment for either ball lens as illustrated in FIGS. 1 through 9.

Another issue is that of reflection feedback into an operating VCSEL 14a. The first surface of ball lens 18 is very close, 50–100 μm, to VCSEL 14a. The air-to-glass interface, when the glass refractive index (of ball lens 18) is 1.8, produces a ~8% reflection. This feedback into VCSEL 14a could degrade its noise characteristics. This invention contemplates at least two ways to reduce or eliminate this reflection problem. The first is to use a transparent epoxy between VCSEL aperture 44 and ball lens 18 as is illustrated in FIG. 7. This would also enhance the mechanical stability, but could also introduce reliability problems. Another way to reduce or eliminate this reflection problem is to perform an extremely light grinding and/or etching on ball lens 18 as is illustrated in FIG. 10. An appropriate micro-roughness on lens 18 surface may actually act as an anti-reflection coating without significantly changing the lens's refractive properties. An additional benefit of this technique is that it would act upon the opposite surface of lens 18 where the beam exits. The grinding and/or etching process(es) may be performed en masse with many ball lenses, so the added cost would be negligible. It should be appreciated that it may be desirable to grind or etch lens 20 as well. Therefore, the teachings with regard to lens 18 may be used in conjunction with lens 20 as well.

Figure 11:
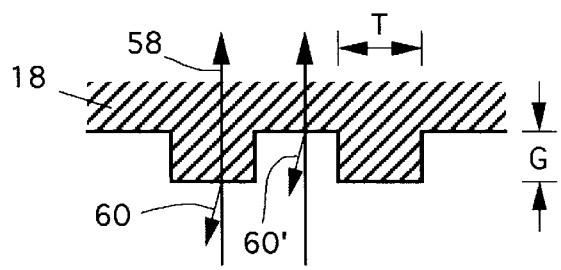
FIG. 11, is yet another alternate embodiment for either ball lens as illustrated in FIGS. 1 through 9.

Turning now to FIG. 11, one specific embodiment for the etching of ball lens 18 is disclosed which provided an anti-reflective coating on lens 18. In a preferred embodiment, the surface of lens 18 is etched to form valleys which approximate a depth G and a width T. Therefore, the surface of lens 18 would have alternating peaks and troughs in the surface. The optimal depth G is determined by the equation:

$$G=(\lambda/4)/(N_b-N_r) \qquad (5)$$

where $N_b$ is the index of refraction for the ball lens 18 and $N_r$ is the index of refraction of the material disposed between ball lens 18 and chip 38. As may be seen from FIGS. 5, 7 and 9, this material may vary. For convenience, the following discussion will only look at the case where the material is air. It should be appreciated that the solution to equation 5 is valid for any material disposed between lens 18 and chip 38. Therefore the following discussion is pertinent to any material which satisfied equation 4. In FIG. 9, the material is air which has an n=1 therefore the above equation simplifies to $G=\lambda/4$, where $N_b=2$. As may be seen, some light rays 58 pass through lens 18 unobstructed. Light rays 60 and 60' which are reflected from the surface lens 18 will interfere destructively. In this manner, reflection between lens 18 and chip 38 are reduced. Additionally, this grating on the surface of ball lens 18 helps to collimate the light rays. It should be appreciated that the entire lens 18 may be constructed in this manner or merely a portion of lens 18 may be constructed. Furthermore, it should be appreciated that other forms of reflection reducing surfaces may be constructed on lenses 18,20.

It should be appreciated that it may be desirable to grind or etch lens 20 as well to form a reflection reducing surface. Therefore, the discussion of grinding or etching of lens 18 also applies to lens 20 in a limited fashion.

Now that the relationship between the optoelectronic transducer 14 and lens 18 has been fully described, it is time to turn to the specific embodiments which illustrate different housing structures which may be utilized in conjunction with the optical coupling system 16. In particular, the reader is referred to FIGS. 3, 4, 5 and 6.

For clarity, like elements in FIGS. 3, 4, 5 and 6 have been provided with like reference numeral except that a prime has been added to each reference numeral where there is a slight difference in the particular element in this embodiment or additional reference numerals are provided to discuss entirely different structures.

Turning now to FIG. 3, a rugedized housing 36 for connector 10 is illustrated. Housing 36 is formed of several parts. For example, a header or stage 52 is provided with three pins 56. It should be appreciated that there may be more or less pins 56, depending on the particular electrical design layout of optoelectronic transducer 14. For example, if transducer 14 is a VCSEL 14a, then there may only need to be two pins 56. The transducer 14 is mounted to stage 52 as described with respect to FIG. 7, above. Electrical connection to transducer 14 is provided by wire bond 48 as illustrated in FIG. 8a. It should be appreciated that stage 52 may be made from a dielectric material, such as a ceramic or polymer resin so as to electrically insulate transducer 14 from other elements. Disposed on stage 52 is an optional alignment feature 62 which may be utilized for passively aligning stage 52 to a window can 64. Passive alignment feature 62 may be a raised mesa as illustrated or any other passive alignment feature known in the alignment art.

Window can 64 houses ball lens 18 and includes a generally cylindrical housing 66 which in turn mounts a transparent window 68, which may consist of optically flat glass or transparent plastic. Housing 66 has an outwardly extending L-shaped base 70 which may be connected to a stage 52 in any suitable manner, for example, by welding or provide a unitary airtight construction. Region 72 is created by the inner boundary of window can 64 and the outer boundary of ball lens 18. In this embodiment, region 72 may be maintained, for example, with a dry $N_2$ atmosphere or air.

As discussed with respect to FIGS. 7, 8a, 8b, and 9, ball lens 18 is passively aligned to transducer 14. In this manner, elements 14, 18, 52 and 64 are passively aligned with respect to each other and thus are preferably axially symmetric about the optical axis 26 of transducer 14.

However, it will be understood that other assemblies or constructions may be used instead. Similarly, the assembly described above, including the window can 64 with window 68 may consist of a package known in the trade as a TO-46 assembly or window can, which is available from Kyocera. By utilizing a transparent window 68 optoelectronic transducer 14 is protected from adverse environmental influences because the window can 64 is sealed to stage 52. In a preferred embodiment, housing 66 may be made of a corrosion-resistant metal, stainless steel, ferrite-based stainless steel, an SUS430-based metal, an SUS430F metal or a metal having a nature corresponding to that of the aforementioned metals.

An optical fiber receptacle 74 is provided which has an axial bore 76 for mating with fiber 12. As may be seen, receptacle 74 has first and second recessed regions 80 and 82, respectively. Region 80 has a diameter which is smaller than region 82. Since ball lens 20 has a diameter greater than region 80 but less than 82, lens 20 is automatically centered within receptacle 74 without the need for active alignment. A ball lens is preferred for lens 20 because of its orientational isotropy. Since axial bore 76 may be accurately located through receptacle 74, lens 20 is accurately aligned with bore 76 and optical waveguide 12 therein. A transparent window 84, which may consist of optically flat glass or transparent plastic, is provided to hermetically seal receptacle 74. In this manner, elements 12 and 20 are passively aligned with respect to each other and thus are preferably axially symmetric about the optical axis 28 of waveguide 12.

A coupling sleeve 86 is provided to attach window can 64 to receptacle 74. Coupling sleeve 86 is conventional in nature and may be a compression coupling sleeve or any other connector known in the connecting art. One of the salient features of this invention is the non-criticality of coupling sleeve 86. As may be seen, even when window can 64 is attached to receptacle 74 with optical axes 26 and 28 not the same and displaced by a distance d as discussed above, a beam from transducer 14 sill is focused onto axis 28. By allowing for a system that has this tolerance one is able to provide connector 10 with an optical coupling efficiency of between 20% and 100%.

Turning now to FIG. 4, a connector 10' having fewer components than the connector 10 of FIG. 3 is illustrated. The windows 68 and 84, coupling sleeve 86 and window can 64 are eliminated. A single fiber pigtail housing would be fabricated separately as discussed above. A ball lens 20, selfoc® lens 20, or other lens 20 is aligned to the waveguide 12 by the techniques discussed above. As may be seen, receptacle 74' and associated region 82' is extended for fitting directly onto the stage on which transducer 14 is mounted. Despite a lateral displacement, d, of VCSEL 14a (and therefore also its mounted ball lens 18) on stage 52, the beam is relayed accurately and efficiently onto/from waveguide 12 with an optical coupling efficiency of between 20% and 100%. Use of sufficiently sized lenses insures that the beam will focused onto waveguide 12 at near-normal incidence. As shown in FIGS. 4 and 6, an epoxy or any other attaching means 88 may be optionally used to hold ball lens 18 in place once the receptacle 74' is installed. Epoxy could also be used to hold ball lens 18 to the chip 38 and/or to place the wire bond as discussed with respect to FIGS. 7, 8a, 8b, and 9. Although the receptacle 74' is illustrated as a metal, it could comprise other materials such as a molded plastic or ceramic. The stage 52 could be a standard part such as a TO-46, or it could be a custom part.

As discussed with respect to FIGS. 7, 8a, 8b, and 9, ball lens 18 is passively aligned to transducer 14. In this manner, elements 38, 18, and 52 are passively aligned with respect to each other and thus are preferably axially symmetric about the optical axis 26 of transducer 14. Additionally, elements 12 and 20 are passively aligned with respect to each other and thus are preferably axially symmetric about the optical axis 28 of waveguide 12. As may be seen, optical axes 26 and 28 are not the same and are displaced by a distance d as discussed above. By allowing for a system that has this tolerance one is able to provide connector 10 with an optical coupling efficiency of between 20% and 100%.

The same package design could be employed for single-mode receivers. FIG. 6 illustrates a connector 10''' for a receiver package. Its similarity to the package of FIG. 4 is readily apparent. This package offers passive alignment to a very-small-area detectors 14b on chip 38'. The package should be suitable for passive alignment to a detector 14b of about 10 μm across. Small-area detectors 14b offer greatly reduced capacitance, lower noise, lower dark current and higher speed over larger-area detectors. Current packaging technology would require active alignment to such small detectors. Thus, receivers can benefit from the same cost-and-performance advantages gained by a laser transmitter of the proposed design.

Referring back to FIG. 5, the components of connector 10'' which is a low-cost transmitter package which produces a collimated light emitter 14a output beam. Such a component is readily useful for a host of applications, especially with visible-emitting VCSELs for pointers and barcode scanners. Preferably, lens 18' has a refractive index of about twice that of region 72'. Typically region 72' will be filled with plastic having an index of refraction of approximate 1.5. Thus, lens 18' would preferably have an index of refraction of about 3. A suitable material for such a lens 18' is gallium phosphide.

It should be appreciated that while FIGS. 1, 2, 3, 4, 5 and 6 illustrate second lens 20 abutted to waveguide 12, it is possible for there to be a gap between lens 20 and waveguide 12. In particular, if the index of refraction of lens 20 is below 2, it is desirable to have this gap between elements 12 and 20. Additionally, it should be appreciated that lenses 18 and 20 may be of different sizes.

Next, a method for fabricating connector 10 will be discussed. The first step in fabricating the connector is to fabricate a vertical cavity surface emitting laser (VCSEL) 14a. This may be accomplished in many ways. The reader is referred to the following U.S. Patents and applications which describe methods for forming VCSELs: 1) U.S. application No. 08/574,165, entitled "Conductive Element with Lateral Oxidation Barrier," filed Dec. 18, 1995; 2) U.S. application Ser. No. 08/659,942, entitled "Light Emitting Device Having an Electrical Contact Through a Layer Containing Oxidized Material," filed Jun. 7, 1996; 3) U.S. application Ser. No. 08/686,489 entitled "Lens Comprising at Least One Oxidized Layer and Method for Forming Same," filed Jul. 25, 1996; 4) U.S. application Ser. No. 08/699,697 entitled "Aperture Comprising an Oxidized Region and a Semiconductor Material," filed Aug. 19, 1996; 5) U.S. application Ser. No. 08/21,769 entitled "Extended Wavelength Strained Layer Lasers Having Short Period Superlattices," filed Sep. 25, 1996; 6) U.S. application Ser. No. 08/721,589 entitled "Extended Wavelength Strained Layer Lasers Having Strain Compensated Layers," filed Sep. 25, 1996; 7) U.S. application Ser. No. 08/721,590 entitled "Extended Wavelength Strained Layer Lasers Having Nitrogen Disposed Therein," filed Sep. 25, 1996; 8) U.S. application Ser. No. 08739,020 entitled "Extended Wavelength Strained Layer Lasers Having a Restricted Growth Surface and Graded Lattice Mismatch," filed Oct. 28, 1996; and 9) U.S. application Ser. No. 08/796,111 entitled "Intra-Cavity Lens Structures for Semiconductor Lasers," filed Feb. 7, 1997. It should be appreciated that all of these applications are invented by the applicant for the present invention. These applications are hereby incorporated by reference.

Figure 13B:
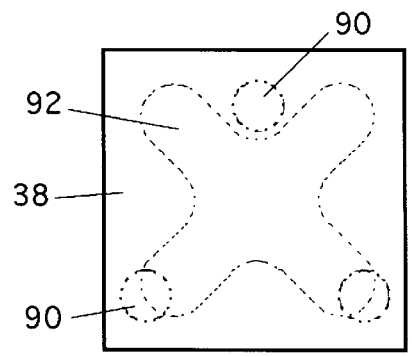

In addition to the wafer scale VCSEL fabrication, the fabrication of at least one alignment feature 40, 42 on transducer 14 is performed, the formation of which may be within the multiple VCSEL fabrication steps. For a detailed discussion of this, the reader is referred to the discussion of FIGS. 8a and 8b of this application. The third step is to dice a chip 38 containing transducer 14. This is accomplished in a conventional fashion as is taught by the semiconductor dicing art. Next, chip 38 is mounted to the to header 52. This step is explained in detail with reference to FIGS. 7, 13a and 13b. Then ball lens 18 is mounted to the alignment feature 40,42 and thereby passively aligns ball lens 18 to transducer 14. This alignment is discussed in greater detail above. Finally, waveguide 12 is connected to header 52 as described in the numerous embodiments above.

Although the present invention has been fully described in conjunction with the preferred embodiment thereof with reference to the accompanying drawings, it is to be understood that various changes and modifications may be apparent to those skilled in the art. Such changes and modifications are to be understood as included within the scope of the present invention as defined by the appended claims, unless they depart therefrom.

What is claimed:

1. A connector comprising:
   an optoelectronic transducer having a transducer axis through a center of said optoelectronic transducer, and a first alignment means in contact with a single surface of said optoelectronic transducer;
   an optical fiber having a fiber axis being different than said transducer axis;
   a first lens comprising a ball lens disposed between said optoelectronic transducer and said optical fiber, a center of said first lens aligned to said optoelectronic transducer axis by said first alignment means; and
   a second lens between said optical fiber and said first lens, a center of said second lens aligned to said fiber axis by a second alignment means;
   wherein said first and second lenses form an optical relay which relays light between said center of said optoelectronic transducer and said center of said optical fiber, forming an efficient optical coupling between said optoelectronic transducer and said optical fiber, even though said transducer axis and said fiber axis do not coincide.

2. The connector recited in claim 1, wherein said transducer axis and said fiber axes are parallel.

3. The connector recited in claim 1, wherein said transducer axis and said fiber axis are displaced by ±25 µm from each other.

4. The connector recited in claim 1, wherein said second lens is a ball lens.

5. The connector recited in claim 1, wherein a center of said first lens is positioned a distance D from a center of said second lens, where D=F1+F2, where F1 is the focal length of said first lens and F2 is the focal length of said second lens.

6. The connector recited in claim 1, wherein said optical fiber is a single mode fiber.

7. The connector recited in claim 1, wherein said optoelectronic transducer is a surface emitting laser.

8. The connector recited in claim 1, wherein said optoelectronic transducer is a vertical cavity surface emitting laser.

9. The connector recited in claim 1, further comprising a stage and wherein said optoelectronic transducer is positioned at a predetermined position on said stage to an accuracy of 4.5 µm from said predetermined position on said stage.

10. The connector recited in claim 1, wherein said second lens has a focal length f, where $f \approx d/k(NA)n_w$, where k is the angular tolerance criterion, NA is the numerical aperture of said optical fiber, and $n_w$ is the refractive index of said optical fiber.

11. The connector recited in claim 10, wherein k is ½.

12. The connector recited in claim 1, wherein said second lens has a radius of at least 277.3 µm.

13. The connector recited in claim 1, wherein said first lens has a radius R, where $R \approx d/2k(NA)*(n_l/n_w)$, where k is the angular tolerance criterion, NA is the numerical aperture of said transducer, n, is the refractive index of said first lens, and $n_w$ is the refractive index of said optical fiber.

14. The connector recited in claim 13, wherein k is ½.

15. The connector recited in claim 1, wherein said first lens has a diameter of at least 0.455 mm.

16. The connector recited in claim 1, wherein said first lens has a radius R1 which is different that a radius R2 for said second lens.

17. The connector recited in claim 1, wherein said first lens has an index of refraction which is 2±0.25 times that of any material in contact with said first lens.

18. The connector recited in claim 1, wherein said second lens has an index of refraction which is 2±0.25 times that of any material in contact with said first lens.

19. The connector recited in claim 1, wherein said first aligning means supports said first lens above said optoelectronic transducer in order to provide a gap between said first lens and said transducer.

20. The connector recited in claim 1, wherein said optoelectronic transducer resides on an optoelectronic chip; and said first lens has a diameter which exceed a longest dimension of said optoelectronic chip.

21. The connector recited in claim 1, wherein said optical relay has a coupling efficiency of between 20% and 100%.

22. A connector comprising:
   an optoelectronic transducer having a transducer axis and a first alignment means in contact with a single surface of said optoelectronic transducer;
   an optical waveguide having a waveguide axis through a center of said optical waveguide and being different than said transducer axis,
   a ball lens proximate to said optoelectronic transducer, a center of said ball lens aligned to said optoelectronic transducer axis by said first alignment means; and
   a second lens disposed between said optical waveguide and said ball lens, a center of said second lens aligned to said waveguide axis by a second alignment means.

23. The connector recited in claim 22, wherein said transducer axis and said waveguide axes are parallel.

24. The connector recited in claim 22, wherein said transducer axis and said waveguide axis are displaced by ±25 µm from each other.

25. The connector recited in claim 22, wherein said second lens is a ball lens.

26. The connector recited in claim 22, wherein said optoelectronic transducer is a vertical cavity surface emitting laser.

27. The connector recited in claim 22, wherein said second lens has a focal length f, where $f \approx d/k(NA)n_w$, where k is the angular tolerance criterion and K=½, NA is the numerical aperture of said optical waveguide, and $n_w$ is the refractive index of said optical waveguide.

28. The connector recited in claim 22, wherein said first lens has a radius R, where $R \approx d/2k(NA)*(n_l/n_w)$, where k is the angular tolerance criterion and k=½, NA is the numerical aperture of said transducer, $n_l$ is the refractive index of said first lens, and $n_w$ is the refractive index of said optical waveguide.

29. The connector recited in claim 22, wherein said first aligning means supports said first lens above said optoelectronic transducer in order to provide a gap between said first lens and said transducer.

30. The connector recited in claim 22, wherein said optoelectronic transducer resides on an optoelectronic chip; and said first lens has a diameter which exceed a longest dimension of said optoelectronic chip.

31. The connector recited in claim 22, wherein said connector has a coupling efficiency of between 20% and 100%.

32. A connector comprising:
   an optoelectronic transducer having a transducer axis through a center of said optoelectronic transducer, and a first alignment means in contact with a single surface of said optoelectronic transducer;
   an optical waveguide having a waveguide axis being different than said transducer axis;
   a first lens comprising a ball lens disposed between said optoelectronic transducer and said optical waveguide, a center of said first lens aligned to said optoelectronic transducer axis by said first alignment means;

a second lens between said optical waveguide and said first lens, a center of said second lens aligned to said waveguide axis by a second alignment means;

a stage, said optoelectronic transducer is positioned at a predetermined position on said stage, said stage further comprising at least one alignment feature thereon;

a first housing for attaching to said stage and being aligned with said optoelectronic transducer, said housing enclosing said first lens and said optoelectronic transducer; and a second housing for attaching to said waveguide and enclosing said second lens;

wherein said first and second lenses form an optical relay which relays light between said center of said optoelectronic transducer and said center of said optical fiber, forming an efficient optical coupling between said optoelectronic transducer and said optical fiber, even though said transducer axis and said fiber axis do not coincide.

33. The connector recited in claim 32, wherein said optoelectronic transducer is positioned to an accuracy of 4.5 $\mu$m from said predetermined position on said stage.

34. The connector recited in claim 32, wherein said transducer axis and said waveguide axes are parallel.

35. The connector recited in claim 32, wherein said transducer axis and said waveguide axis are displaced by ±25 $\mu$m from each other.

36. The connector recited in claim 32, wherein said second lens is a ball lens.

37. The connector recited in claim 32, wherein said optoelectronic transducer is a vertical cavity surface emitting laser.

38. The connector recited in claim 32, wherein said second lens has a focal length f, where $f = d/k(NA)n_w$, where k is the angular tolerance criterion and K=½, NA is the numerical aperture of said optical waveguide, and $n_w$ is the refractive index of said optical waveguide.

39. The connector recited in claim 32, wherein said first lens has a radius R, where $R \approx d/2k(NA)*(n_l/n_w)$, where k is the angular tolerance criterion and k=½, NA is the numerical aperture of said transducer, $n_l$ is the refractive index of said first lens, and $n_w$ is the refractive index of said optical waveguide.

40. The connector recited in claim 32, wherein said first aligning means supports said first lens above said optoelectronic transducer in order to provide a gap between said first lens and said transducer.

41. The connector recited in claim 32, wherein said optoelectronic transducer resides on an optoelectronic chip; and said first lens has a diameter which exceed a longest dimension of said optoelectronic chip.

42. The connector recited in claim 32, wherein said connector has a coupling efficiency of between 20% and 100%.

43. The connector recited in claim 32, further comprising attaching means for attaching said first and second housing to each other.

44. A connector comprising:

an optoelectronic transducer having a transducer axis through a center of said optoelectronic transducer, and a first alignment means in contact with a single surface of said optoelectronic transducer;

an optical waveguide having a waveguide axis being different than said transducer axis;

a first lens comprising a ball lens disposed between said optoelectronic transducer and said optical waveguide, a center of said first lens aligned to said optoelectronic transducer axis by said first alignment means;

a second lens between said optical waveguide and said first lens, a center of said second lens aligned to said waveguide axis by a second alignment means;

a stage, said optoelectronic transducer is positioned at a predetermined position on said stage, said stage further comprising at least one alignment feature thereon;

a housing for attaching to said stage and to said waveguide, said housing being aligned with said optoelectronic transducer, said housing enclosing said first and second lenses and said optoelectronic transducer; and wherein said first and second lenses form an optical relay which relays light between said center of said optoelectronic transducer and said center of said optical fiber, forming an efficient optical coupling between said optoelectronic transducer and said optical fiber, even though said transducer axis and said fiber axis do not coincide.

45. The connector recited in claim 44, wherein said optoelectronic transducer is positioned to an accuracy of 4.5 $\mu$m from said predetermined position on said stage.

46. The connector recited in claim 44, wherein said transducer axis and said waveguide axes are parallel.

47. The connector recited in claim 44, wherein said transducer axis and said waveguide axis are displaced by ±25 $\mu$m from each other.

48. The connector recited in claim 44, wherein said second lens is a ball lens.

49. The connector recited in claim 44, wherein said optoelectronic transducer is a vertical cavity surface emitting laser.

50. The connector recited in claim 44, wherein said second lens has a focal length f, where $f \approx d/k(NA)n_w$, where k is the angular tolerance criterion and K=½, NA is the numerical aperture of said optical waveguide, and $n_w$ is the refractive index of said optical waveguide.

51. The connector recited in claim 44, wherein said first lens has a radius R, where $R \approx d/2k(NA)*(n_l/n_w)$, where k is the angular tolerance criterion and k=½, NA is the numerical aperture of said transducer, $n_l$ is the refractive index of said first lens, and $n_w$ is the refractive index of said optical waveguide.

52. The connector recited in claim 44, wherein said first aligning means supports said first lens above said optoelectronic transducer in order to provide a gap between said first lens and said transducer.

53. The connector recited in claim 38, wherein said optoelectronic transducer resides on an optoelectronic chip; and said first lens has a diameter which exceed a longest dimension of said optoelectronic chip.

54. A light emitter comprising:

a vertical cavity surface emitting laser (VCSEL) residing on a semiconductor chip, said VCSEL also comprising a first alignment means in contact with a single surface of to said VCSEL; and a lens aligned to said VCSEL by said first alignment means, in which said lens has a lateral dimension which exceeds a lateral dimension of said semiconductor chip.

55. The light emitter recited in claim 54, further comprising a stage, said optoelectronic transducer being positioned at a predetermined position on said stage; and a first housing for attaching to said, said housing enclosing said first lens and said optoelectronic transducer.

56. The light emitter recited in claim 55, wherein said stage further comprises at least one alignment feature thereon, said alignment feature for aligning said stage to said housing and thereby passively aligning said optoelectronic transducer to said housing.

57. The light emitter recited in claim 55, wherein said housing is hermetically sealed to said stage.

58. The light emitter recited in claim 55, wherein said housing is filled with a material having an index of refraction which is ½ of an index of refraction for said first lens.

59. A light emitter comprising:
- a vertical cavity surface emitting laser (VCSEL) residing on a semiconductor chip, said VCSEL also comprising a first alignment means in contact with a single surface of said VCSEL;
- a ball lens aligned to said VCSEL by said first alignment means;
- a stage, said optoelectronic transducer being positioned on said stage; and
- a first housing for attaching to said, said housing enclosing said first lens and said optoelectronic transducer.

60. The light emitter recited in claim 59, wherein said housing is hermetically sealed to said stage.

61. The light emitter recited in claim 59, wherein said housing is filled with a material having an index of refraction which is ½ of an index of refraction for said first lens.

62. The connector recited in claim 1, wherein said first lens has an antireflective surface over at least a portion of said first lens.

63. The connector recited in claim 22, wherein said first lens has an antireflective surface over at least a portion of said first lens.

64. The connector recited in claim 32, wherein said first lens has an antireflective surface over at least a portion of said first lens.

65. The connector recited in claim 44, wherein said first lens has an antireflective surface over at least a portion of said first lens.

66. The connector recited in claim 64, wherein said first lens has an antireflective surface over at least a portion of said first lens.

67. The connector recited in claim 1, wherein said first lens has an antireflective surface over at least a portion of said first lens.

68. A method for fabricating a connector comprising the steps of:
- fabricating a vertical cavity surface emitting laser (VCSEL), said VCSEL having a first optical axis through a center of said VCSEL;
- fabricating at least one alignment feature on a surface of said VCSEL;
- dicing a chip containing said VCSEL;
- mounting said chip to a header;
- mounting a ball lens to said alignment feature and thereby passively aligning said ball lens to said VCSEL;
- connecting a waveguide to said header so that said waveguide has a second optical axis being different so that said first optical axis.

* * * * *